US011635824B1

(12) United States Patent
Beck et al.

(10) Patent No.: US 11,635,824 B1
(45) Date of Patent: Apr. 25, 2023

(54) MECHANICAL KEY STATE MODIFIER COMPONENT

(71) Applicant: Lenovo (Singapore) Pte. Ltd., Morrisville, NC (US)

(72) Inventors: Kevin W Beck, Raleigh, NC (US); Thorsten Stremlau, Raleigh, NC (US); Russell Speight VanBlon, Raleigh, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 17/554,543

(22) Filed: Dec. 17, 2021

(51) Int. Cl.
*G06F 3/02* (2006.01)
*H01H 13/705* (2006.01)
*G06F 3/01* (2006.01)
*G06F 1/16* (2006.01)

(52) U.S. Cl.
CPC .......... *G06F 3/0202* (2013.01); *H01H 13/705* (2013.01); *G06F 1/1662* (2013.01); *G06F 3/016* (2013.01)

(58) Field of Classification Search
CPC ...... G06F 3/0202; G06F 1/1662; G06F 3/016; H01H 13/705
See application file for complete search history.

(56) References Cited

U.S. PATENT DOCUMENTS

2008/0169911 A1* 7/2008 Klinghult ................. G06F 3/02
340/407.1
2015/0302966 A1* 10/2015 Soelberg ................ G06F 3/023
463/37

* cited by examiner

*Primary Examiner* — Amit Chatly
(74) *Attorney, Agent, or Firm* — Ference & Associates LLC (57) ABSTRACT

One embodiment provides a device, including: a mechanical keyboard; a key state component mechanically co-located with each of a plurality of keys of the mechanical keyboard, wherein the key state component changes state between at least actuated and unactuated; a processor; a memory device that stores instructions executable by the processor to: detect an input to change a state of the key state component for at least one of the plurality of keys; and change, responsive to the input, the state of the key state component for the at least one of the plurality of keys. Other aspects are described and claimed.

20 Claims, 4 Drawing Sheets

MECHANICAL KEY STATE MODIFIER COMPONENT

BACKGROUND

Many information handling devices (e.g., tablets, laptops, smartphones, personal computing devices, televisions, smart watches, refrigerators, etc.) have associated keyboards. The keyboards allow users to input letters, numbers, symbols, and the like, which the device can then process and perform some function, which may be as simple as displaying the provided input on a display device. While many portable information handling devices include digital keyboards, referred to as soft keyboards, many devices still include mechanical keyboards that have physical keys. Whether a device has a soft keyboard or a mechanical keyboard often is based upon space, application, user preference, and the like. Many users prefer the feel and feedback of a mechanical keyboard.

BRIEF SUMMARY

In summary, one aspect provides a device, including: a mechanical keyboard; a key state component mechanically co-located with each of a plurality of keys of the mechanical keyboard, wherein the key state component changes state between at least actuated and unactuated; a processor; a memory device that stores instructions executable by the processor to: detect an input to change a state of the key state component for at least one of the plurality of keys; and change, responsive to the input, the state of the key state component for the at least one of the plurality of keys.

Another aspect provides a method, including: detecting an input to change a state of at least one key state component of a plurality of key state components, wherein each of the plurality of key state components are mechanically co-located with one of a plurality of keys of a mechanical keyboard, wherein the key state component changes state between at least actuated and unactuated; and changing, responsive to the input, the state of the key state component for the at least one of the plurality of keys.

A further aspect provides a product, including: a storage device that stores code, the code being executable by a processor and including: code that detects an input to change a state of at least one key state component of a plurality of key state components, wherein each of the plurality of key state components are mechanically co-located with one of a plurality of keys of a mechanical keyboard, wherein the key state component changes state between at least actuated and unactuated; and code that changes, responsive to the input, the state of the key state component for the at least one of the plurality of keys.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Due to the layout and standard keys of a mechanical keyboard, the functions of the keyboard are limited. Specifically, the keys of a keyboard have binary functions, a default function and an alternate function. Since there are only so many keys on a keyboard, the number of functions are limited. Additionally, the size and form factor of the keyboard cannot be changed due to size constraints of the information handling device that the keyboard is installed within, which reduces the number of functions that can be performed on the keyboard. Thus, in order to perform complex actions, the user has to provide multiple presses or provide input to multiple keys at a time to initiate an action. For example, each key of the keyboard may have an alternate function which generally requires the user to provide an input to a modifier key (e.g., Shift, Ctrl, Alt, etc.) in addition to the key.

Additionally, the keyboard may include switches that toggle functions of the information handling device, for example, toggling power to external displays, toggling power to near-field communication devices, toggling into or out of airplane mode, and the like. However, these switches are generally binary switches having off and on values. If the keyboard supports dual languages, providing desired inputs may become even more complex. For example, if the keyboard is in one language mode but a user wants to input a character (e.g., number, letter, picto-character, symbol, etc.) corresponding to an alternate function of the other language mode, the user has to change the input mode to the other language mode, and then perform the series of steps to obtain the alternate character. When characters from both language modes are integrated into the same task, this changing back and forth becomes extremely time consuming and very inefficient.

Accordingly, an embodiment provides a device having a mechanical keyboard. The mechanical keyboard includes many different keys. The device also includes a key state component that is mechanically co-located with at least a portion or subset of the keys of the mechanical keyboard. Each key on the keyboard may have different numbers of key state components. For example, one key may have no key state components, whereas another key has four or more key state components. In one embodiment, the key state component is muscle or memory wire. The key state component changes states between at least an actuated state and an unactuated state. Depending on the key state component utilized, the key state component may have additional states. For example, using muscle wire as the key state component allows for different actuation levels. The more voltage or heat that is applied to the muscle wire, the stiffer the muscle wire.

When the device detects an input to change the state of the key state component for at least one of the keys that has a corresponding key state component, the device changes the state of the key state component. Changing the state of the key state component provides a tactile indication that the function of the key has been modified. This is in contrast to conventional keyboards which, at best, have a light or other visual indication that indicates an alternate function is active. Additionally, since each key may have different functions and unique key state components, the activation of an alternate function can be limited to a single key instead of a whole group of keys as found in conventional keyboards.

The illustrated example embodiments will be best understood by reference to the figures. The following description is intended only by way of example, and simply illustrates certain example embodiments.

Figure 1:
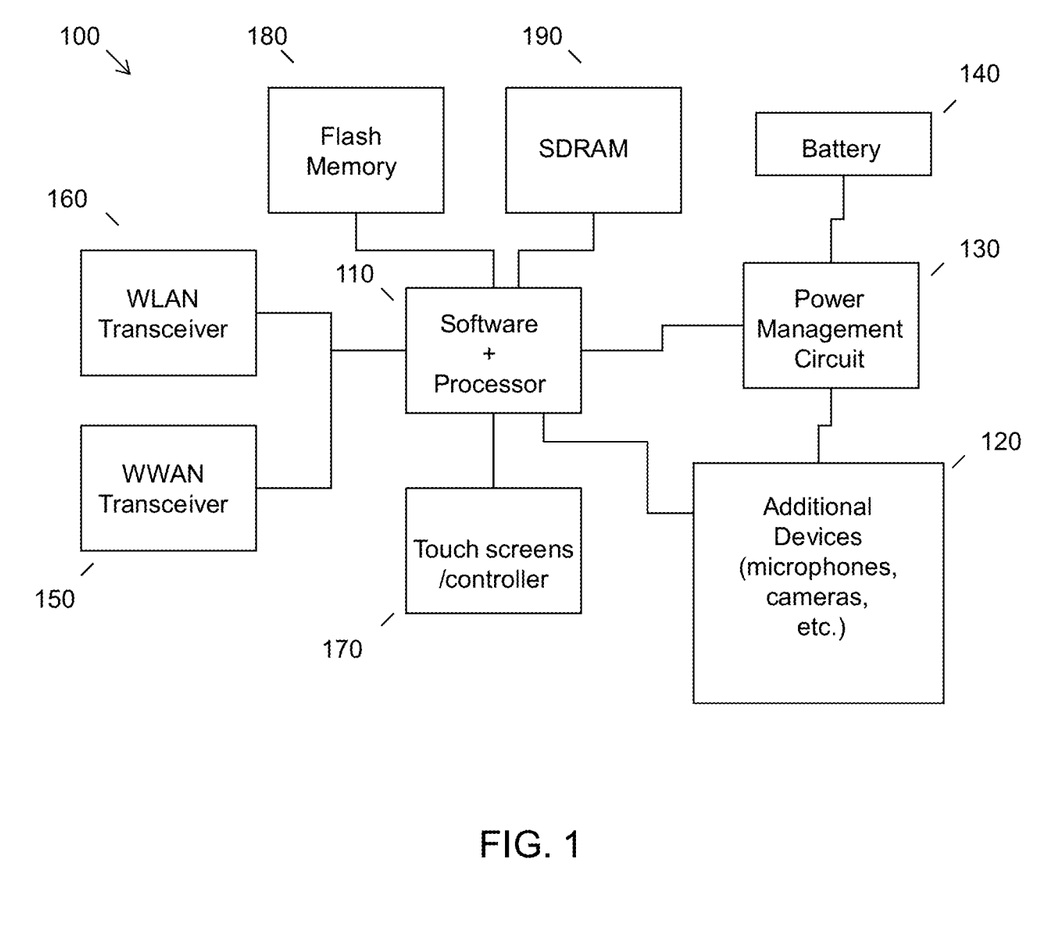
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes an augmented reality device 170 for data input and display/rendering. System 100 also typically includes various memory devices, for example flash memory 180 and SDRAM 190.

Figure 2:
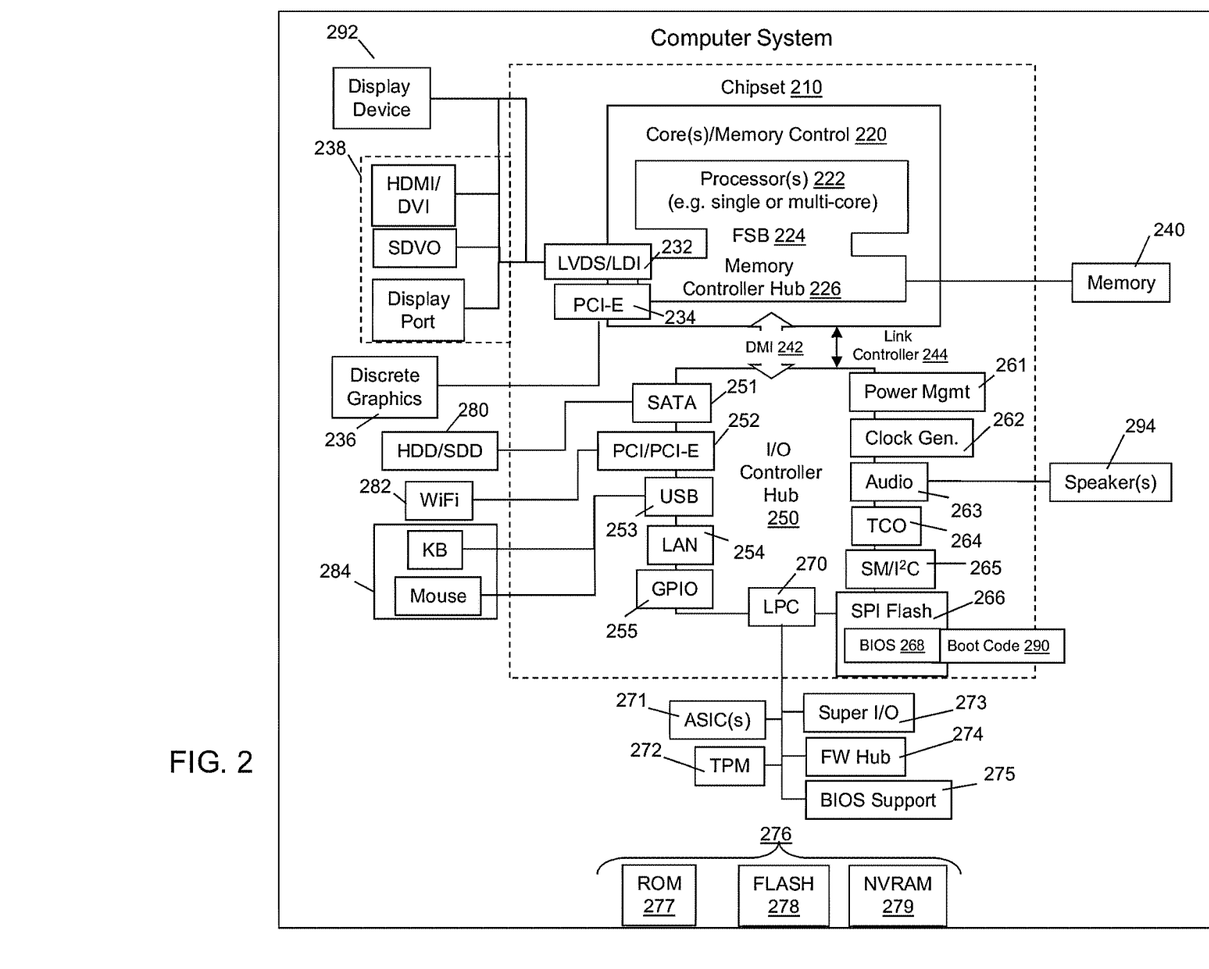
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of receiving and processing input from an input device described herein and may also be capable of providing instructions to an input device described herein. For example, the circuitry outlined in FIG. 1 may be implemented in a smart phone, whereas the circuitry outlined in FIG. 2 may be implemented in a laptop or personal computer embodiment.

The described device provides a mechanical keyboard that includes key state components that provide additional functionality to the mechanical or hardware-based keyboard. The keyboard includes a plurality of keys. At least a portion of the keys include a key state component that is mechanically co-located with a key. The key state component is mechanically co-located with the physical key. This means that the key state component may not be physically attached to the key, but may touch the key or a portion of the key, particularly in an actuated state. Thus, the key state component is located in the same area as the key in order to provide the described functions to the keys.

Each key that includes a key state component may have one or more key state components. Additionally, not all keys that include a key state component have to include the same number of key state components as the other keys having a key state component. In other words, each key of the keyboard may have different numbers of key state components, for example, one key may have no key state components and another key may have four or more key state components. This allows each key to have different numbers of alternate functions. Additionally, since each key that has a key state component has its own unique key state component, the actuation of one key state component does not depend on the actuation of another key state component. Thus, instead of an alternate function being applied to a group of keys or the entire keyboard, as in conventional keyboards, the alternate function can be applied to just a single key. However, it should be understood that some alternate functions may be applied to a group of keys of the keyboard. For example, a Num Lock function could be applied to all number keys.

Thus, the described keyboard can work like a traditional keyboard where alternate functions are applied to a group or all of the keys of the keyboard, or may be applied on a key-by-key basis. The number of keys included in an alternate function activation may be dependent on the alternate function applied, the application that the input is being provided into, programming or selections by the user, or the like. In other words, since each key has its own unique key state component(s), the functions of the keyboard can be highly modifiable.

The key state component changes states between at least an actuated state and an unactuated stated. Depending on the key state component material that is used, the key state component may have varying degrees or gradients of actuation. The example key state component that will be used here throughout is muscle or memory wire. However, this is not intended to limit the scope of this disclosure to muscle or memory wire as other key state component may be utilized, for example, other components, devices, or materials that expand, contract, or otherwise change state upon the application of voltage, heat, current, power, or the like. Muscle wire is a thin wire that contracts or flexes when current or heat is applied to the wire. This attribute can be utilized with the described device to provide tactile function indicators for keys of the keyboard, resistance for a key of the keyboard, and even height or switch gradients for a key. Each of these embodiments will be explained in more detail in connection with the figures.

When the device or system detects an input to change the state of a key state component for at least one of the plurality of keys that has a corresponding key state component, the device or system changes the state of the key state component for the key. The input may be different depending on how the key state component is incorporated with the key. However, the provided input is designed such that it indicates to the system that an alternate function for a key should be activated. Thus, some example inputs may include a long press to a key, movement of a switch, activation of a secondary key different from the target key, activation of a secondary key different from the target key in addition to activation of the target key, and the like. The term target key will refer to the key of the keyboard that the user wants to utilize to provide input to the underlying application, display device, or the like. For example, if a user wants to provide the letter "A", the "A" key is the target key. As another example, if a user wants to provide the symbol "$", the "4" key is the target key since the "$" is the alternate function of the "4" key.

Example secondary key activations include activation of a modifier key, which may be a standard modifier key such as Ctrl, Shift, Alt, and the like, or a programmed modifier key meaning one of the keys has been specifically identified as a modifier or alternate function activation key. Inputs may also be based upon software programming. For example, the system may be programmed that receiving input from one key should prevent activation of another key. Thus, the state of the key state component of the another key will be actuated so that the another key cannot be depressed.

Changing the state of the key state component may be momentary or may be set until another input is received changing the state of the key state component again. In the case that the changing of the state is momentary, the state may be changed for a single press of a key associated with the key state component that is being changed. After the key has been pressed or input has been provided to the key, the key state component may be changed back to a default setting. As a practical example, this example would be similar to how pressing and holding Shift+another key modifies the function of the another key while the Shift key is depressed. When the Shift key is released, the function of the another key returns to the default setting. However, it should be understood that in the described device, it is not strictly necessary that another key, like a modifier key, be depressed as input is being provided to the target key. Rather, any of the described key state component activation input methods may be utilized, which does include activation of a secondary key while input is provided to the target key.

The described device will be better understood by way of illustrative examples, as found in FIGS. 3A-3C, 4A, and 4B.

It should be understood that these figures are merely illustrative examples for the purpose of explaining the concept. Accordingly, it should be understood that the disclosure is not strictly limited to the examples described in connection with these figures.

Figure 3A:
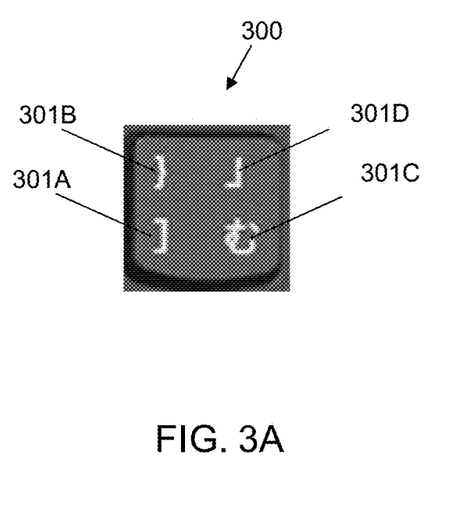
FIG. 3A illustrates an example standard key of a dual language mechanical keyboard.
Figure 3B:
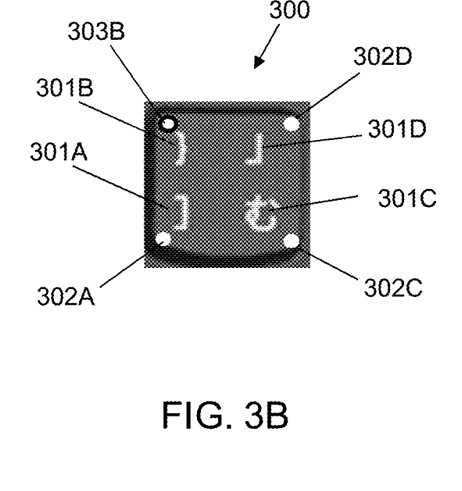
FIG. 3B illustrates an example of the standard key of FIG. 3A having one actuated key state component and three unactuated key state components.
Figure 3C:
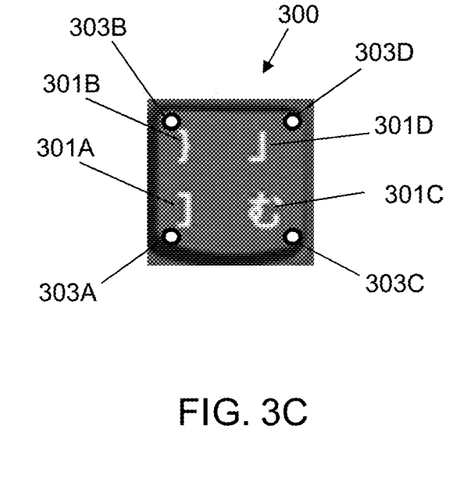
FIG. 3C illustrates an example of the standard key of FIG. 3A having all four key state components selectable.

FIGS. 3A-3C illustrate an example implementation of key state components on a standard keyboard key. FIG. 3A illustrates an example standard key 300. This standard key 300 is from a dual language keyboard which allows input using either English or Japanese. Thus, this standard key 300 has four functions. Two of the functions are default functions and two of the functions are alternate functions, with the active default and alternative functions being based upon the language input mode selected. Thus, if the English language input mode is selected, the right English square bracket 301A is the default function and the right English curly bracket 301B is the alternate function of the key. If the Japanese language input mode is selected, the right Japanese bracket 301C is the default function and the Japanese alternate bracket 301D is the alternate function of the key. Thus, if the user is in the Japanese language input mode and wants to provide the right English curly bracket 301B as the input, the user has to switch to the English language input mode and then provide input to the modifier key in addition to the standard key 300, which is time consuming and clunky.

FIG. 3B illustrates an example of the same standard key 300, but with key state components. In this illustrated example, each key having a key state component includes one or more holes in the peripheral of the key. This example includes four holes, one in each corner and one corresponding to each possible function of the standard key 300. Thus, since the key has four possible functions, the key has four holes and four key state components. Accordingly, it should be understood that keys having fewer functions would have fewer holes and fewer key state components. Additionally, it should be noted that the location of the holes may be different than illustrated in this example. For example, the holes may be located under each of the characters on the key.

The key state component is positioned with the key such that, when the key state component is actuated, the key state component protrudes through the hole a particular distance so that a user could feel the key state component. This provides a tactile indicator of which function is active for the target key. In this example, key state component 303B is activated, meaning the key state component corresponding to the hole at 303B is actuated and protruding through the hole 303B. Thus, if the user touches the key at the location of 303B, the user would feel the key state component, thereby providing the user with tactile feedback that the alternate function of the English input mode (i.e., the right English curly bracket 301B) is activated and input to the key will input the right English curly bracket into the underlying program. Locations 302A, 302C, and 302D are not activated, so if the user touches at any of these locations, the user would not feel the key state component and may or may not feel the hole at that location.

FIG. 3C illustrates an example where the user can select which function to activate for the standard key 300. Depending on the programming, the input provided to indicate that a key state component state should be changed may indicate that a key state component state should be changed, but may not indicate which of the key state components of a key should have the state changed. Thus, upon receiving such an input, all of the key state component states may be changed to actuated so that all the key state components protrude through its corresponding hole. This is illustrated in FIG. 3C, where locations 303A, 303B, 303C, and 303D all have key state components protruding through the holes. The user can then feel the key state components and provide input to one of the key state components of the key 300 to indicate which function should be activated. This selection will then cause the key state component of the active function to remain actuated while the remaining key state components are unactuated so that only the key state component of the active function remains protruding through its corresponding hole. This provides a quick technique for changing the function of the key a reducing the number of steps that need to be taken by the user to perform the desired function.

Upon receiving another input to change the function of the key, another of the key state components would protrude through its corresponding hole. Depending on the function activated, the first key state component may remain protruding or may be retracted. This allows cycling through all the functions of the key using the same function activation input. As a non-limiting example, if the user long pressed the target key a first time, the first key state component corresponding to a first function would protrude. Upon a second long press, the second key state component corresponding to a second function would protrude. Upon a third long press, the third key state component corresponding to a third function would protrude. One of these functions may be a default function and more or fewer functions may be provided for a single key.

Some functions of the keys may be designated by combinations of key state components. These may be "hidden" functions. A hidden function is one that is not designated on the key itself and may be a default hidden function, programmed by the user, based upon an underlying application, a combination thereof, or the like. As an example, the key press combination of "Ctrl+B" may activate a bold function. This would be considered a hidden function. Applied to the described device, as an example, when the bold function is active, more than one key state component of the "B" key may be actuated to indicate the active state of the bold function. Thus, a key having four key state components may be programmed with sixteen different functions.

Figure 4A:
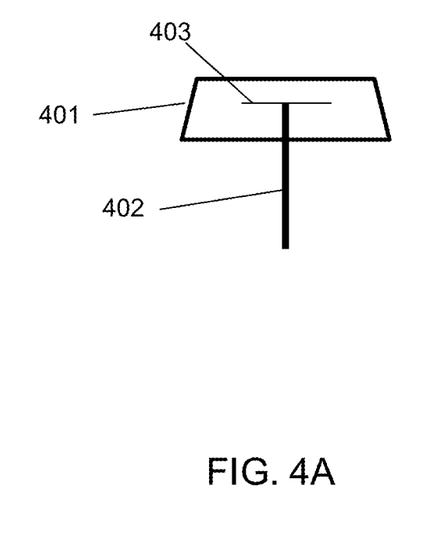
FIG. 4A illustrates an example side view of a keyboard key having a key state component offering resistance to the actuation of the key.

FIG. 4A illustrates an example of a key state component 402 resting against a back portion 403 of a key 401. This illustration is a transparent side view of a key. It should be understood that the dimension relationships and component locations illustrated may be different than shown, as the illustration is only intended to assist in understanding. In this example, the key state component 402 is located underneath the key 401 and rests against a portion of the key 401. For illustrative purposes, the key 401 is shown as having a flat portion 403 that the key state component 402 rests against. However, this may not be included as illustrated. Rather, the back portion 403 may be any underneath portion of the key 401.

The key state component 402 can be utilized in this technique to provide resistance to a downward force on the key 401. In other words, the key state component 402 can make it harder to depress or completely prevent depressing the key 401. This may be useful in a typing training application. The system may be programmed to guide the user in selecting a correct key. Thus, if the system determines that one key cannot logically follow another key, the system may activate the key state component 402 so that the one key cannot be depressed or so that it is harder to depress in order to guide the user to the correct key. For example, in English there are few if any cases of normal words where the letter following the letter "q" is not the letter "u". Thus, if the user were to press the letter "q" the system may lock out the letters "y" and "i" so that if the user accidentally mishits one of those keys, the user is guided to the "u" key. In the same vein, the key could have multiple key state components 402 underneath and each could offer a different resistance so that the key tips a certain way upon pressing it so as to guide the user in the correct direction to the correct key. Using the "q" example, if the user mishits the "i", the key state components can be actuated so that the "i" key tips to the left, thereby guiding the user's finger to the "u" key.

Figure 4B:
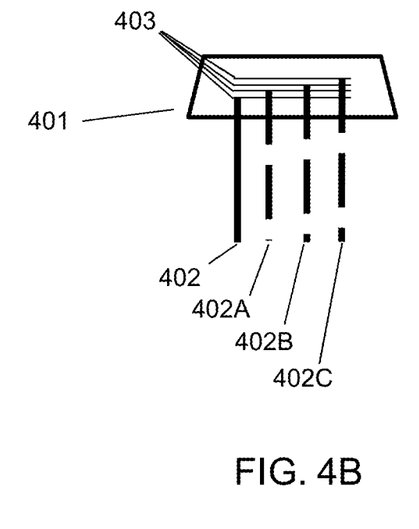
FIG. 4B illustrates an example side view of a keyboard key having multiple indents that the key state component can be located within.

Similarly, in FIG. 4B, instead of having a single back portion as in FIG. 4A, the key 401 may have back portion having multiple indents 403. The key state component 402 may rest against one of these indents. As different voltage or heat values are applied, the key state component 402 may change a level of stiffness, represented by 402A, 402B, and 402C, with each level of stiffness corresponding to a different indent 403. 402A, 402B, and 402C represent a different state of the same key state component 402 and not individual key state components. Each of these indents could correspond to a gradient of the function of the key. Another configuration may be a rolling clicker where each change in state of the key state component causes the wheel to turn to a different indent. Each of the indents would corresponding to a different gradient of the function of the key. An example application would be in place of a switch or other key that has multiple gradient functions. For example, a screen brightness key usually has to be pressed multiple times to change the gradient. However, the user is not apprised of the value just by feeling the key. Using the described system, different gradients would cause the key to be at different heights. Thus, the user could tell by simply feeling the key a general brightness level.

While the embodiments of FIGS. 3A-3C and FIG. 4A and FIG. 4B are discussed separately, it should be understood that a single key may incorporate more than one embodiment. For example, a single key may have key state components in the peripheral, as described in connection with FIGS. 3A-3C and may also have a key state component under the key to provide resistance to the key as discussed in connection with FIG. 4A and/or may have multiple indents to provide gradient functions as discussed in connection with FIG. 4B. Thus, the features described in connection with the figures should not be understood to be unique to separate embodiments, as the features of each of the embodiments can be incorporated into another of the embodiments.

The various embodiments described herein thus represent a technical improvement to conventional mechanical keyboard devices. Conventional mechanical keyboards do not offer a tactile feedback of a modified function for a key on the keyboard. At best, the conventional keyboards offer a visual indicator of a key change in function via a light or possibly a display screen indicator. The described device offers a tactile feedback via a protrusion, resistance, or height adjustment of the key using a key state component, for example, muscle or memory wire. Additionally, conventional mechanical keyboards only allow for a change in function of all the keys of the keyboard or, at the smallest increment, a row or section (e.g., the number pad) of the keyboard. The described device allows for a change in function of a single key. Thus, the change in function can be applied to a single key or a small number of keys as opposed to entire sections of the keyboard as required in conventional keyboards.

Additionally, the device allows for each key to have more than one alternate function as compared to conventional keyboards which only allow for a single alternate function for each key. Thus, the described device provides for more functionality than conventional keyboards. Additionally, since each key can have multiple alternate functions, the described device allows for easier user interface than conventional keyboards which require multiple key presses or series of key presses in order to provide the same alternate functions.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A device, comprising:
   a mechanical keyboard;
   a key state component mechanically co-located with each of a plurality of keys of the mechanical keyboard, wherein the key state component changes state between at least actuated and unactuated;
   a processor;
   a memory device that stores instructions executable by the processor to:
   detect an input to change a state of the key state component for at least one of the plurality of keys, wherein each of the plurality of keys comprises a plurality of holes, each of the plurality of holes located at a peripheral of a key and each of the plurality of holes having a corresponding key state component; and
   change, responsive to the input, the state of the key state component for the at least one of the plurality of keys, wherein the key state component corresponding to at least one of the plurality of holes protrudes through the at least one of the plurality of holes in an actuated state.

2. The system of claim 1, wherein the key state component comprises muscle wire and wherein the changing comprises applying one of voltage and heat to the muscle wire.

3. The system of claim 1, wherein the input comprises an input to change the function of at least one of the plurality of keys; and
   wherein, responsive to changing the function of the at least one of the plurality of keys, another of the key state components corresponding to another of the at least one of the plurality of holes protrudes through the another of the at least one of the plurality of holes.

4. The system of claim 1, wherein each of the plurality of keys comprises a clicker comprising a plurality of indents and wherein the key state component is located against one of the plurality of indents and moves to and is located against a different of the plurality of indents upon a change in state.

5. The system of claim 1, wherein the key state component is located against a back of each of the plurality of keys and changes a resistance of a key upon a change in state.

6. The system of claim 5, wherein the input comprises input to at least one key other than the key and wherein to change the key state component of the key is responsive to determining the key is not logically associated with the input provided to the at least one key other than the key.

7. The system of claim 1, wherein the input is selected from the group consisting of: a long press, a switch movement, a secondary key activation other than the at least one of the plurality of keys, and a secondary key activation in addition to activation of the at least one of the plurality of keys.

8. The system of claim 1, wherein to change the state of the key state component comprises changing the state of the key state component for a single press of the at least one of the plurality of keys and changing the state of the key state component back to a default state after the single press.

9. The system of claim 1, wherein the at least one of the plurality of keys corresponds to a plurality of keys of a section of the mechanical keyboard and wherein to change the state of the key state component comprises changing the state of the key state components corresponding to the plurality of keys of the section.

10. A method, comprising:
    detecting an input to change a state of at least one key state component of a plurality of key state components, wherein each of the plurality of key state components are mechanically co-located with one of a plurality of keys of a mechanical keyboard, wherein the key state component changes state between at least actuated and unactuated, wherein each of the plurality of keys comprises a plurality of holes, each of the plurality of holes located at a peripheral of a key and each of the plurality of holes having a corresponding key state component; and
    changing, responsive to the input, the state of the key state component for the at least one of the plurality of keys, wherein the key state component corresponding to at least one of the plurality of holes protrudes through the at least one of the plurality of holes in an actuated state.

11. The method of claim 10, wherein the key state component comprises muscle wire and wherein the changing comprises applying one of voltage and heat to the muscle wire.

12. The method of claim 10, wherein the detecting comprises detecting an input indicating a change to the function of at least one of the plurality of keys;
    changing the function of the at least one of the plurality of keys; and
    changing the state of another of the key state components corresponding to another of the at least one of the plurality of holes to an actuated state.

13. The method of claim 10, wherein each of the plurality of keys comprises a clicker comprising a plurality of indents and wherein the key state component is located against one of the plurality of indents and moves to and is located against a different of the plurality of indents upon a change in state.

14. The method of claim 10, wherein the key state component is located against a back of each of the plurality of keys and changes a resistance of a key upon a change in state.

15. The method of claim 14, wherein the detecting an input comprises detecting input to at least one key other than the key; and
    wherein the changing the key state component of the key is responsive to determining the key is not logically associated with the input provided to the at least one key other than the key.

16. The method of claim 10, wherein the input is selected from the group consisting of: a long press, a switch movement, a secondary key activation other than the at least one of the plurality of keys, and a secondary key activation in addition to activation of the at least one of the plurality of keys.

17. The method of claim 10, wherein the changing the state of the key state component comprises changing the state of the key state component for a single press of the at least one of the plurality of keys and changing the state of the key state component back to a default state after the single press.

18. A product, comprising:
a storage device that stores code, the code being executable by a processor and comprising:
code that detects an input to change a state of at least one key state component of a plurality of key state components, wherein each of the plurality of key state components are mechanically co-located with one of a plurality of keys of a mechanical keyboard, wherein the key state component changes state between at least actuated and unactuated, wherein each of the plurality of keys comprises a plurality of holes, each of the plurality of holes located at a peripheral of a key and each of the plurality of holes having a corresponding key state component; and
code that changes, responsive to the input, the state of the key state component for the at least one of the plurality of keys, wherein the key state component corresponding to at least one of the plurality of holes protrudes through the at least one of the plurality of holes in an actuated state.

19. A device, comprising:
a mechanical keyboard;
a key state component mechanically co-located with each of a plurality of keys of the mechanical keyboard, wherein the key state component changes state between at least actuated and unactuated;
a processor;
a memory device that stores instructions executable by the processor to:
detect an input to change a state of the key state component for at least one of the plurality of keys, wherein each of the plurality of keys comprises a clicker comprising a plurality of indents and wherein the key state component is located against one of the plurality of indents and moves to and is located against a different of the plurality of indents upon a change in state; and
change, responsive to the input, the state of the key state component for the at least one of the plurality of keys.

20. A method, comprising:
detecting an input to change a state of at least one key state component of a plurality of key state components, wherein each of the plurality of key state components are mechanically co-located with one of a plurality of keys of a mechanical keyboard, wherein the key state component changes state between at least actuated and unactuated, wherein each of the plurality of keys comprises a clicker comprising a plurality of indents and wherein the key state component is located against one of the plurality of indents and moves to and is located against a different of the plurality of indents upon a change in state; and
changing, responsive to the input, the state of the key state component for the at least one of the plurality of keys.

* * * * *